United States Patent [19]
Norin

[11] 3,763,768
[45] Oct. 9, 1973

[54] AUTOMATIC FOOD WARMER
[75] Inventor: Allan A. Norin, Chicago, Ill.
[73] Assignee: Fredrick Dorsey Montgomery, Chicago, Ill.
[22] Filed: Nov. 3, 1970
[21] Appl. No.: 86,515

[52] U.S. Cl.................................. 99/483, 259/75
[51] Int. Cl............................................. A23i 1/00
[58] Field of Search................. 99/234, 234 T, 348, 99/324, 325, 326, 331, 332, 327, 483; 126/346, 21; 34/164; 219/400; 259/DIG. 18, 75

[56] References Cited
UNITED STATES PATENTS
3,071,473   1/1963   Churley............................ 99/234 T
3,384,002   5/1968   Bonuchi............................ 99/234 T
3,501,620   3/1970   Sauer................................ 99/234 T Primary Examiner—Robert W. Jenkins
Attorney—James P. Hume

[57] ABSTRACT

A machine for reconstituting and heating dry frozen foods to serving temperatures including a housing having an oscillatable frozen food container support mounted thereon. An electric motor driven mechanism in the housing oscillates the container support. A burner oscillates with the container support. A water reservoir and a water dispensing apparatus are located in the housing and arranged to supply a measured quantity of water to the frozen food container. Timers provide two heating cycles of different time durations.

9 Claims, 6 Drawing Figures

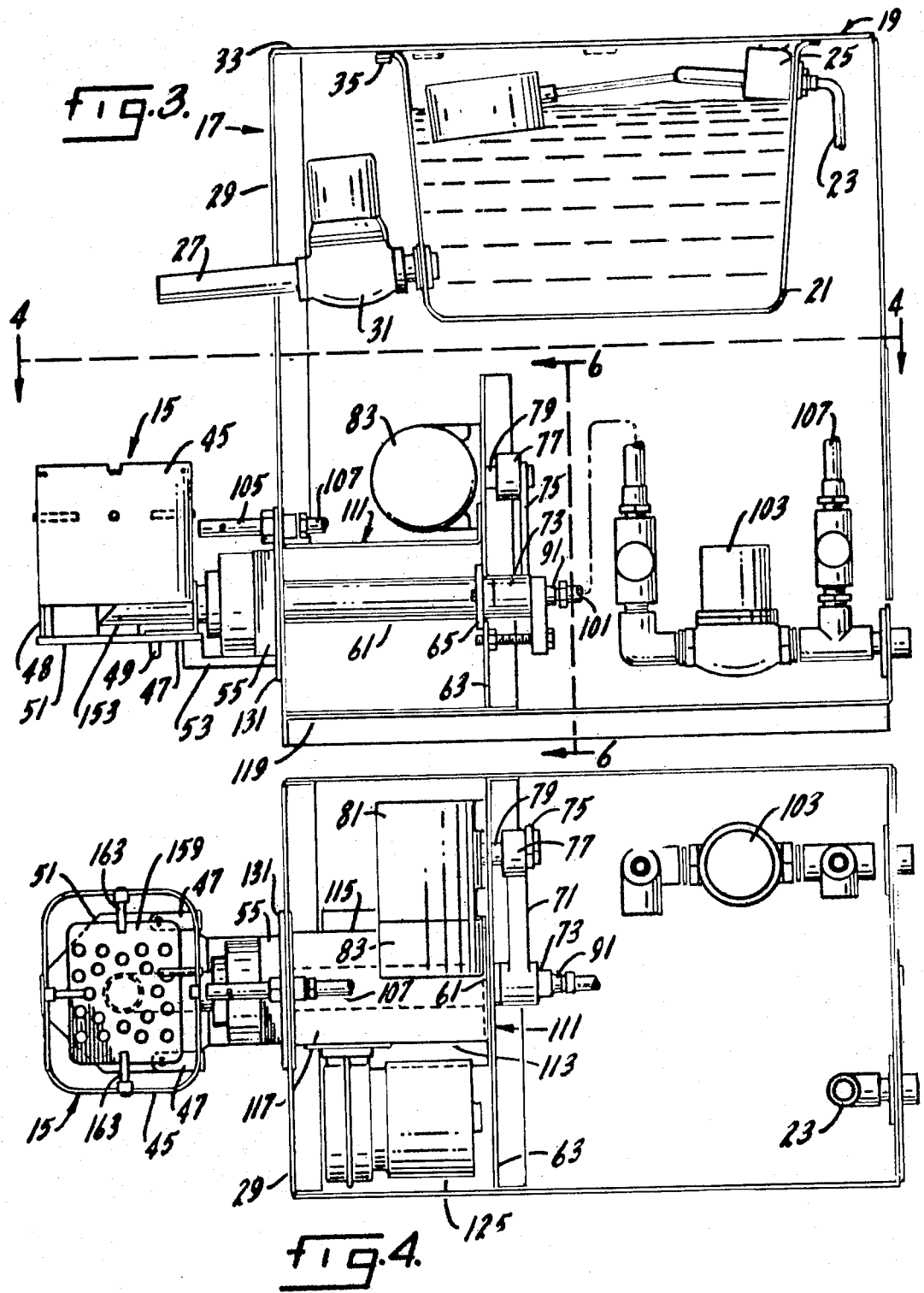

AUTOMATIC FOOD WARMER

SUMMARY OF THE INVENTION

This invention is directed to a machine for automatically reconstituting dry frozen foods and heating the reconstituted food to its serving temperature. It is particularly directed to a machine which may be used in restaurants and other food serving activities to automatically reconstitute and heat individual as well as larger portions of food.

An object of this invention is a machine that automatically reconstitutes and heats frozen food quickly from the frozen state without scorching the food.

Another object is a machine which automatically adds a predetermined quantity of water to a dry frozen food to reconstitute the food.

Another object is a machine that automatically agitates a frozen food during heating to aid in the reconstitution of the food and to prevent scorching.

Another object is a machine for reconstituting a dry frozen food and heating the food to a serving temperature which is self-contained and simple to operate.

Another object is a machine for reconstituting and heating a dry frozen food which has at least two separate heating cycles of different time durations.

Other objects will be found in the following specification, claims and drawings.

BRIEF DESCRIPTION OF THE DRAWINGS

The invention is illustrated more or less diagrammatically in the following drawings wherein:

FIG. 3 is a vertical cross-sectional view taken through the machine;

FIG. 4 is a cross-sectional view taken along line 4—4 of FIG. 3;

DESCRIPTION OF THE PREFERRED EMBODIMENT

Figure 1:
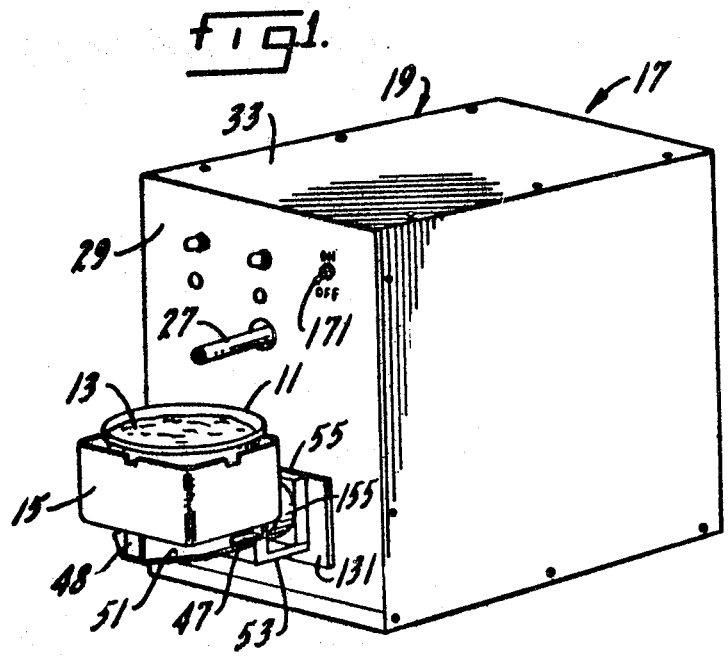
FIG. 1 is a perspective view of a machine embodying the novel features of this invention.

FIG. 1 shows an individual crimped aluminum container 11 containing frozen food 13 carried on a support 15 of the machine 17 of this invention. In FIG. 3, a cross-section of the machine 17 is shown including a housing 19 in which is located a water reservoir 21. The reservoir is supplied with water through a conduit 23 which is controlled by a float valve 25 located in the reservoir. A discharge conduit 27 from the reservoir extends through the front face 29 of the housing 19 to discharge above the frozen food support 15. The flow of water through this conduit is controlled by a solenoid operated valve 31. The reservoir 21 is supported on the top panel 33 of the housing by means of brackets 35. The reservoir may be removed for cleaning by sliding it out from the brackets.

The frozen food container support 15 includes a shield 45 of rectangular cross-section attached to angle legs 47 and a straight leg 48. Pegs 49 connected to the bases of the angle legs 47 fit through openings (not shown) in a bracket plate 51. The straight leg 48 rests on the bracket plate. As is most clearly shown in FIG. 5, the bracket plate 51 is bolted to a bracket 53. The bracket 53 in turn is bolted to a cover 55. The cover 55 has a centrally located collar portion 57 which is fastened to a tube 59.

The bracket support tube 59 is journalled inside a bearing support tube 61. The bearing support tube is attached to and supported on an interior partition 63 of the housing 19 by means of a plate 65 formed as part of the bearing tube and attached by bolts to the partition 63. The bracket support tube 59 is journalled in bearings 67 positioned at opposite ends of the tube 61.

Figure 5:
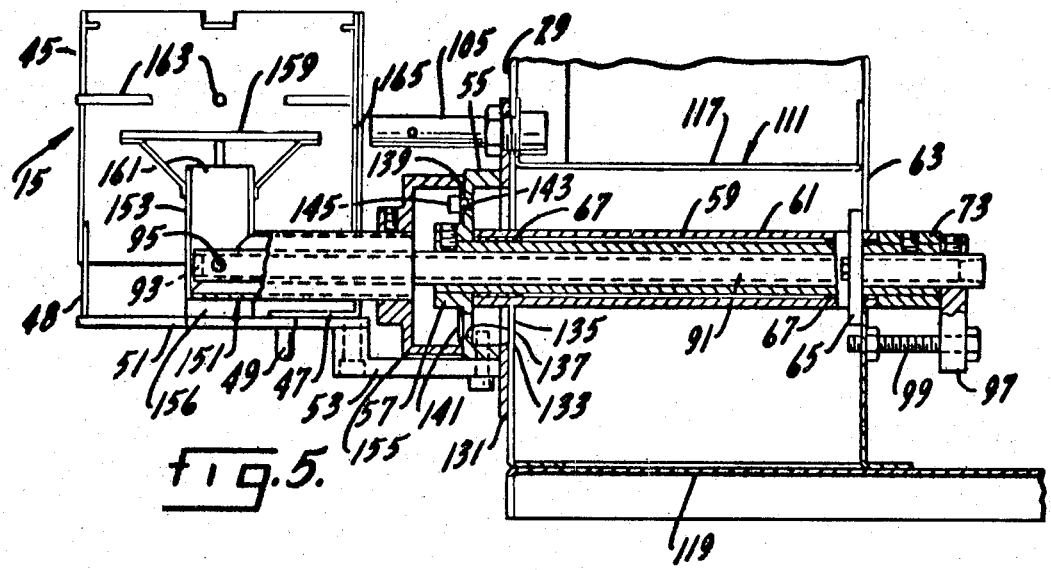
FIG. 5 is an enlarged partial cross-sectional view of the burner and rocking mechanism of the invention.

The bracket support tube 59 extends beyond the end of the bearing support tube 61 shown at the right in FIG. 5. A crank arm 71 is fastened to this end of the tube 59 through means of an integral looped portion 73 of the crank arm which fits over the tube 59 and is fastened thereto. The opposite end of the crank arm 71 is pivotally connected to one end of a link 75. The opposite end of the link 75 is pivotally connected to a crank 77 which is affixed to the output shaft 79 of a reduction gear box 81 of an electric motor 83.

A gas supply tube 91 extends through the bracket support tube 59 into the burner shield 45 where its end is closed by a plug 93. Outlet openings 95 are formed in the tube near the plugged end. The opposite end of the tube extends through, is supported by and is fastened to an upright 97. The upright 97 is supported on a bolt 99 which is fastened to the partition 63. The gas supply tube 91 is connected by conduit 101 to a solenoid operated control valve 103. A pilot burner 105 is mounted on the face panel 29 of the housing and is supplied by a conduit 107 which connects to the gas conduit 101 ahead of the solenoid control valve 103.

Figure 6:
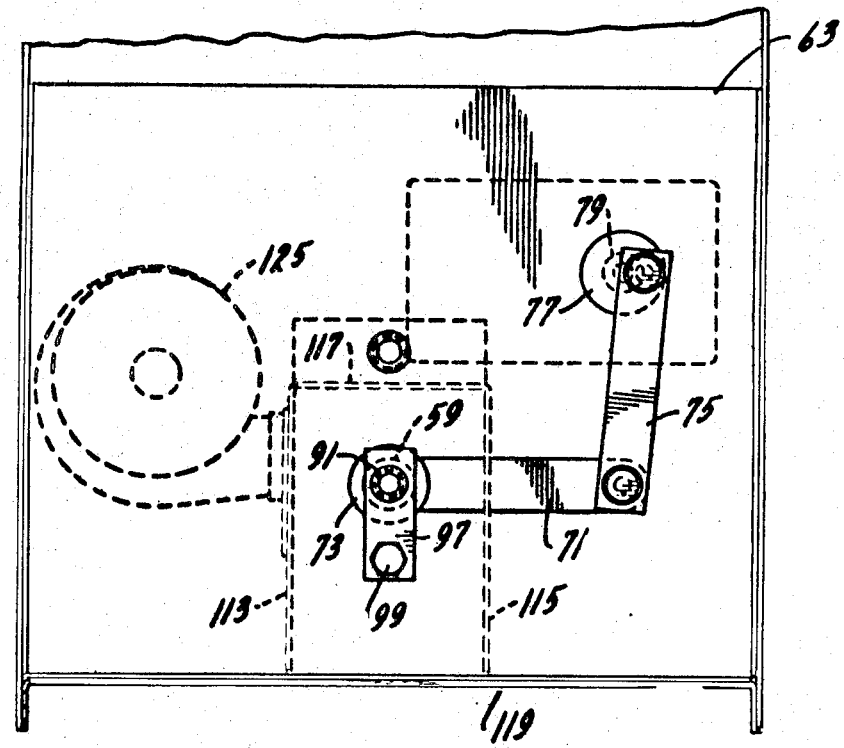
FIG. 6 is a partial cross-sectional view taken along line 6—6 of FIG. 3.

The partition 63 forms one wall of an air chamber 111. In addition to the partition 63, the chamber has side walls 113 and 115 and a top wall 117. As shown most clearly in FIG. 6 of the drawings, the side and top walls are formed of a single piece of metal bent into an inverted U-shaped member. The bottom panel 119 of the housing 19 forms the base of the chamber and the front panel 29 of the housing functions as the front wall of the chamber. An electric motor driven blower 125 discharges into the air chamber 111 through an opening (not shown) in the side wall 113.

A wear plate 131 is fastened to the housing front panel 29 and has an opening 133 through which the tubes 59 and 61 extend. Openings 135 in the front panel 29 lead from the air chamber 111 into the cover 55 which is affixed to the bracket support tube 59. A series of openings 137 are formed in the end of cover 55 radially outwardly of the collar portion 57 thereof. A damper plate 139 is fastened to the outside end of the cover 55 and is equipped with a series of openings 141. The arrangement and size of openings 137 and 141 respectively in the cover 55 and damper plate 139 are identical so that the openings may be aligned. An arcuate slot 143 is formed in the damper plate and a threaded screw 145 extends through this slot and into a threaded opening in the cover plate 55 to permit rotational adjustment of the openings 141 of the damper plate relative to the openings 137 in the cover. Adjustment of the openings in the cover relative to the openings in the damper plate varies the effective size of the air flow passages through these parts.

The burner 151, which is mounted in the frozen food container support 15, includes an L-shaped tube 153 to which an enlarged cylindrical end portion 155 is fastened. The tube 153 is supported on and attached to the bracket plate 51 by means of a support 156. The end portion 155 encloses the outlet openings 137 and 141 of the cover 55 and damper plate 139. One leg of the L-shaped burner tube 153 receives and surrounds the gas supply tube 91 and connects with the enlarged cylindrical portion 155. The cylindrical portion 155 can be slid along the tube 153 to provide access to the damper plate adjusting screw 145. A perforated baffle plate 159 is mounted above the outlet opening 161 of the burner. The baffle 159 is positioned just below the frozen food container support pins 163 which are attached on the shield 45 and extend inwardly thereof. An opening 165 is formed in the wall of the shield for the pilot light 105.

Figure 2:
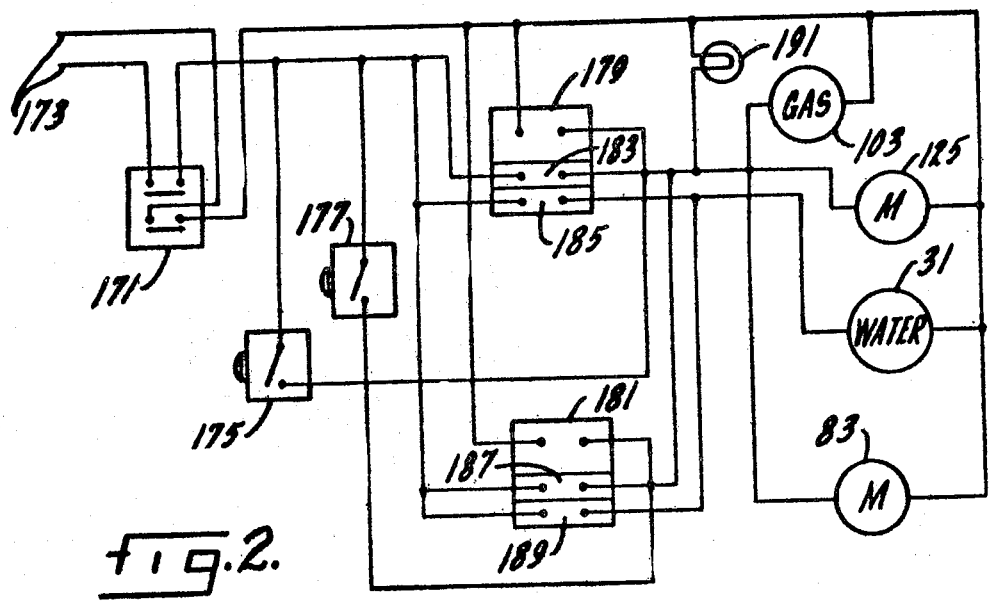
FIG. 2 is a schematic diagram of the electrical circuit of this machine.

Referring to FIGS. 1 and 2, an "on off" switch 171 controls a 110 or 220 volt A.C. circuit 173 into the machine. Push buttons 175 and 177 are provided respectively to control the timer motors 179 and 181. Timer motor 179 provides approximately a three minute cycle while timer motor 181 provides a six minute cycle. Timer switches 183 and 185 of timer motor 179 connect respectively to gas solenoid control valve 103 and water solenoid control valve 31. Timer switches 187 and 189 of timer motor 181 connect respectively to gas solenoid control valve 103 and water solenoid control 31. These switches are also connected to the electric motors 83 and 125 which operate the bracket support tube 59 and the blower. A light 191 is provided in the circuit to indicate the machine is in operation.

The use, operation and function of this invention are as follows:

The operator of the machine obtains a container 11 containing a dry frozen food 13 from a freezer, removes the cover (not shown) and places the container on the support pins 163 of the support 15. While the machine of this invention is adaptable for use in reconstituting frozen foods of almost all types, it is particularly well suitable for reconstituting and heating foods that have been cooked and frozen without excess water and to which has been added an adjuvent of dry seasoning and thickener sufficient to make a sauce or gravy when water is added.

The switch 171 is then turned to its "on" position. The operator then actuates either push button 175 or 177 depending on whether a three minute or six minute cycle is needed to properly prepare the food. Assuming the shorter cycle is used, actuation of the button 175 starts the timer motor 179. The timer switch 183 opens the solenoid valve 103 controlling the gas. This allows gas to move through the conduit 101 and into the gas supply tube 91. The gas leaves this tube through the openings 95 and enters the burner 151. The timer motor switch 183 also actuates the blower motor 125 which forces air into the air chamber 111, through the openings 135 in the front panel 29 of the housing, through the openings 133 in the wear plate 131 and into the cover 55. From the cover 55, the air under pressure passes through the openings 137 and 141 in the cover 55 and damper plate 139. Then, the air enters the enlarged cylindrical portion of the burner and moves into the L-shaped burner tube 153 where it mixes with the gas from the gas tube 91 and passes out the opening 161 where it is ignited by the flame from the pilot 105.

Also activated by the timer switch 183 is the motor 83 which, through its reduction gear 81 and output shaft 79, rotates the crank 77. The rotation of the crank brings about oscillation of the bracket support tube 59. The cover 55 oscillates with the tube 59 and thereby rocks or oscillates the bracket 53 and bracket plate 51. The shield 45, container support pins 163 and burner 151 rock with the support bracket 53.

As the frozen food container 11 is being heated and rocked, the timer switch 185 is actuated, opening the solenoid water control valve 31 to admit water from the reservoir 21 through the discharge spout 27 and into the container 11. The amount of water delivered through the valve 31 is controlled by the length of time the valve is opened since the static head at the discharge outlet is maintained practically constant by the float valve 25. The amount of water delivered through the discharge spout 27 may be varied in accordance with the type of frozen food being heated as well as the quantity thereof. It has been found with some types of specially prepared frozen foods that the addition of four ounces of water to each eight ounce portion provides a proper mixture. The rocking of the frozen food and water during the application of heat assists the reconstitution of the food much in the manner that stirring assists in preparing a sauce.

Upon completion of the heating cycle, the timing motor 179 will turn off thereby closing the gas valve 103 and stopping the motors 83 and 125 for the oscillating mechanism and the air blower motor respectively. The food 13 in the container 11 will then be at its desired serving temperature and consistency and the tray 11 may be removed from the machine.

Whereas the preferred form of the invention has been shown and described, it should be understood that there are many modifications, substitutions and alterations which may be made without departing from the fundamental theme of this invention. Therefore, the scope of the invention should be limited only by the following claims.

I claim:

1. A machine for quickly reconstituting dry frozen foods from a frozen state to a temperature and condition in which the food is ready to be eaten including:
   a housing,
   a frozen food container support mounted outside of said housing for rocking motion about a horizontal axis,
   a burner associated with said frozen food container support,
   means associated with said housing for adding a measured amount of water to a frozen food container located on said frozen food container support,
   means for rocking said frozen food container support about said horizontal axis, and
   means for operating said burner for a preselected period of time during rocking to heat said frozen food container and its contents.

2. The machine of claim 1 further characterized in that said burner is mounted to rock with said frozen food container support.

3. The machine of claim 1 further characterized in that said means for adding a measured amount of water to a frozen food container includes a water reservoir mounted in said housing, a float valve for maintaining a constant water level in said reservoir, a discharge conduit leading from said reservoir and discharging over said frozen food container support, a control valve for said water discharge conduit, and a timer for opening said control valve for a predetermined period of time.

4. The machine of claim 1 further characterized in that said means for rocking said frozen food container support about said horizontal axis includes a horizontally extending tube journalled in said housing, means connecting said frozen food container support to said tube and means for oscillating said tube about its longitudinal axis.

5. The machine of claim 4 further characterized in that means for oscillating said tube includes an arm having one end rigidly connected to said tube, an electric motor having a reduction gear and an output shaft connected to said reduction gear, a crank fastened to said output shaft, a link pivotally connected at one end thereof to said crank and pivotally connected at the opposite end thereof to the free end of said arm.

6. The machine of claim 4 further characterized in that said means connecting said frozen food container support to said tube includes a cover connected to the end of said tube, a bracket connected to said cover with said frozen food container support and said burner mounted on said bracket.

7. The machine of claim 4 further characterized in that said burner is supplied with gas by a conduit which extends through said oscillating tube and air is supplied through openings in said cover from an air chamber in said housing.

8. The machine of claim 7 further characterized in that said burner is equipped with an enlarged base which encloses said openings in said cover and adjustable baffle means are provided to control the flow of air into said base.

9. The machine of claim 1 further characterized in that said means for operating said burner for a preselected period of time during rocking includes a conduit supplying gas to said burner, a solenoid operated valve controlling the flow of gas through said conduit and a timer motor controlling the operation of said solenoid.

* * * * *